(12) United States Patent
Chen

(10) Patent No.: US 12,626,474 B2
(45) Date of Patent: May 12, 2026

(54) VOLUMETRIC SCULPTING USING DUAL CONTOURING

(71) Applicant: Adobe Inc., San Jose, CA (US)

(72) Inventor: Zhiqin Chen, Seattle, WA (US)

(73) Assignee: Adobe Inc., San Jose, CA (US)

( * ) Notice: Subject to any disclaimer, the term of this patent is extended or adjusted under 35 U.S.C. 154(b) by 105 days.

(21) Appl. No.: 18/817,077

(22) Filed: Aug. 27, 2024

(65) Prior Publication Data

US 2026/0065611 A1 Mar. 5, 2026

(51) Int. Cl.
| | |
|---|---|
| *G06T 19/20* | (2011.01) |
| *G06T 15/08* | (2011.01) |
| *G06T 17/20* | (2006.01) |

(52) U.S. Cl.
CPC .............. *G06T 19/20* (2013.01); *G06T 15/08* (2013.01); *G06T 17/20* (2013.01); *G06T 2219/2008* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 2025/0209633 A1* | 6/2025 | Gueth | ....................... | G06T 7/12 |
| 2025/0245903 A1* | 7/2025 | Dane | ....................... | G06T 17/00 |
| 2025/0292509 A1* | 9/2025 | Ladavac | ............... | G06T 17/205 |

FOREIGN PATENT DOCUMENTS

| | | | | |
|---|---|---|---|---|
| EP | 1074946 A2 * | 2/2001 | ............. | G06T 17/00 |
| JP | 4140688 B2 * | 8/2008 | ............. | G06T 17/00 |

OTHER PUBLICATIONS

Qu et al., Feature Preserving Distance Fields, IEEE Symposium on vol. Visualization and Graphics 2004 (Year: 2004).*

* cited by examiner

*Primary Examiner* — Robert J Hance
(74) *Attorney, Agent, or Firm* — FIG. 1 Patents

(57) ABSTRACT

In implementations of techniques and systems for volumetric sculpting using dual contouring, a processing device determines and stores signed distance values of vertices in a voxel grid with multiple grid cells to represent a 3D object. The processing device also determines and stores the position and state of feature points within grid cells. The feature points indicate a geometric feature of the 3D object within a corresponding grid cell. The processing device then uses dual contouring on the signed distance values and feature points to render a mesh of the 3D object.

20 Claims, 7 Drawing Sheets

100

Service Provider System 102

Digital Service Manager Module 108

[•••]  Digital Services 112  [•••]

3D Modeling Service 116

Hardware and Software Resources 110

Inputs 118

Signed Distances 120

Feature Points 122

Action Request 124

Network 106

Rendered Model 126

124

Computing Device 104

[•••]  Communication Module 114  [•••]

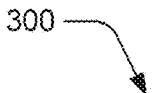

300

```
┌─────────────────────────────────────────────────────────────┐
│                           302                                 │
│   Determine and store the signed distance of each vertex      │
│                    in a voxel grid                            │
└─────────────────────────────────────────────────────────────┘
                              │
                              ▼
┌─────────────────────────────────────────────────────────────┐
│                           304                                 │
│           Determine and store a position and state of         │
│              a feature point within each grid cell            │
│   ┌───────────────────────────────────────────────────────┐  │
│   │                       306                             │  │
│   │  Determine the number of continuous surfaces inside   │  │
│   │                   the grid cell                       │  │
│   └───────────────────────────────────────────────────────┘  │
│                           │                                   │
│                           ▼                                   │
│   ┌───────────────────────────────────────────────────────┐  │
│   │                       308                             │  │
│   │        Determine optimal feature point on the object  │  │
│   └───────────────────────────────────────────────────────┘  │
└─────────────────────────────────────────────────────────────┘
                              │
                              ▼
┌─────────────────────────────────────────────────────────────┐
│                           310                                 │
│          Extract a mesh of the object's surface from          │
│            the signed distances and feature points            │
└─────────────────────────────────────────────────────────────┘
                              │
                              ▼
┌─────────────────────────────────────────────────────────────┐
│                           312                                 │
│          Update the signed distances and feature points       │
│                 after each geometric operation                │
└─────────────────────────────────────────────────────────────┘
```

500
502
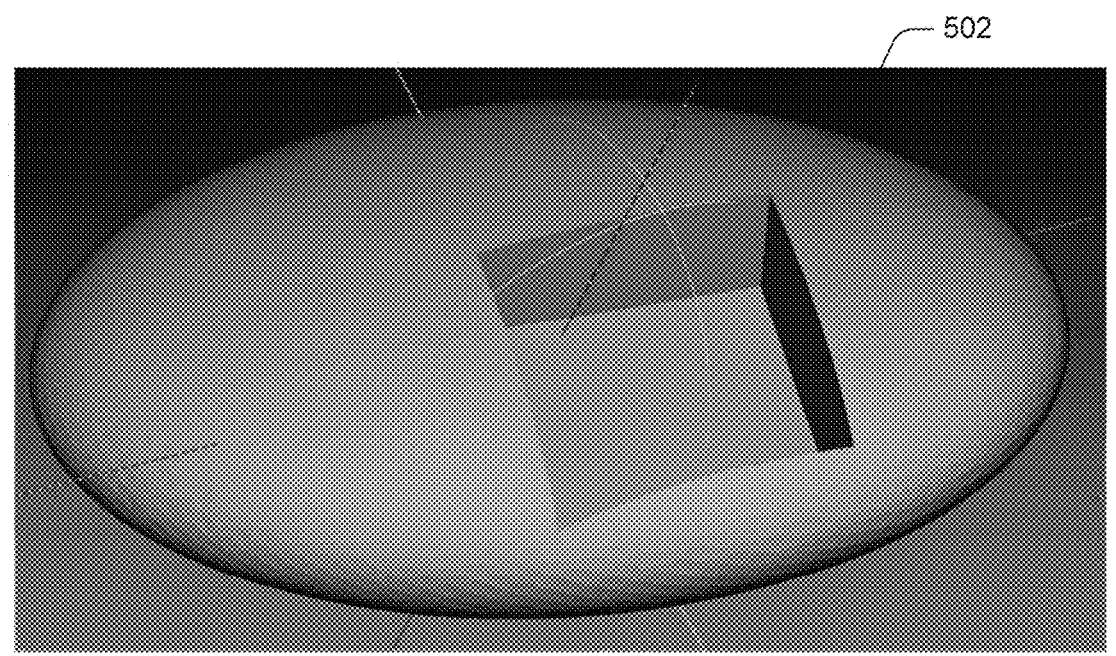
504
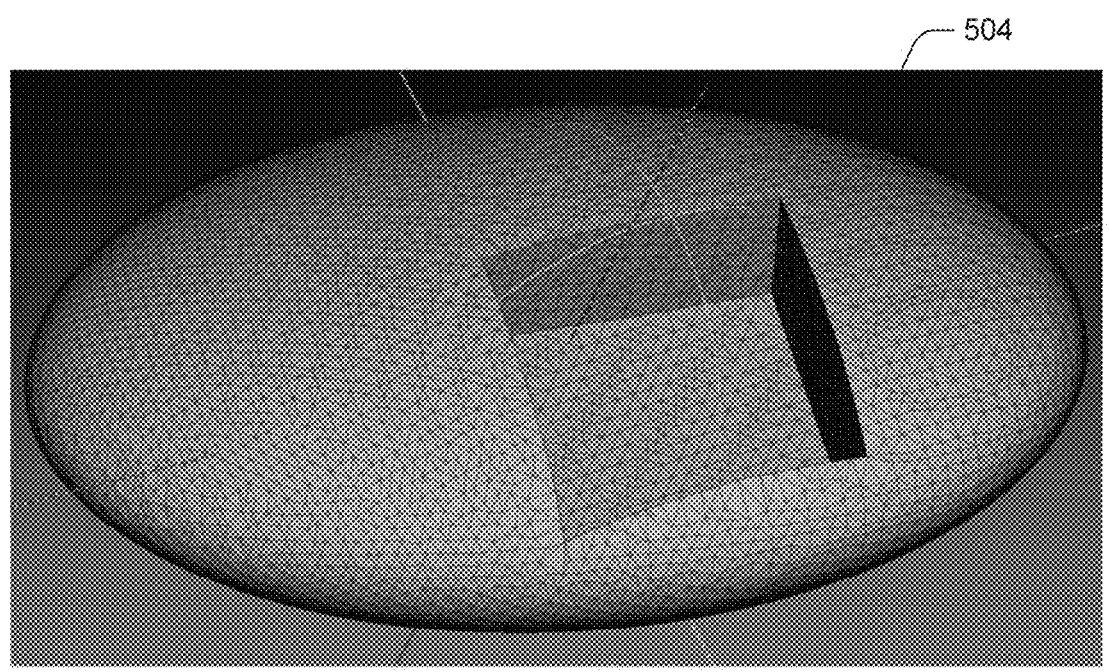
Fig. 5

700

VOLUMETRIC SCULPTING USING DUAL CONTOURING

BACKGROUND

Creating realistic objects and characters is crucial for various applications like video animation, games, and other media. One three-dimensional (3D) modeling technique used to generate realistic objects is volumetric sculpting, which focuses on manipulating the volume of a digital object, rather than just its surface. Volumetric sculpting provides a more intuitive and organic way of modeling but also introduces various technical challenges that cause inaccuracies, visual artifacts, and inefficient use of computational resources.

SUMMARY

Techniques and systems for volumetric sculpting using dual contouring are described. In one example, a processing device determines a signed distance value for vertices in a voxel grid to represent a 3D object. The processing device also determines a position and a state for feature points within grid cells to represent the geometric features of the 3D object. A mesh of the 3D object is then rendered using the signed distances and feature points. For example, the processing device uses dual contouring to generate a mesh or dual marching cubes for a manifold mesh. The rendered mesh is presented to the user via a display device.

This Summary introduces a simplified selection of concepts described below in the Detailed Description. As such, this Summary is not intended to identify essential features of the claimed subject matter or to aid in determining its scope.

BRIEF DESCRIPTION OF THE DRAWINGS

The detailed description is described with reference to the accompanying figures. Entities represented in the figures indicate one or more entities, and thus, reference is made interchangeably to single or plural forms of the entities in the discussion.

FIG. 3 is a flow diagram depicting an algorithm as a step-by-step procedure in an example implementation of operations performable for accomplishing volumetric sculpting using dual contouring.

FIG. 5 illustrates an example object generated using volumetric sculpting with dual contouring after a geometric operation.

DETAILED DESCRIPTION

Overview

Figure 1:
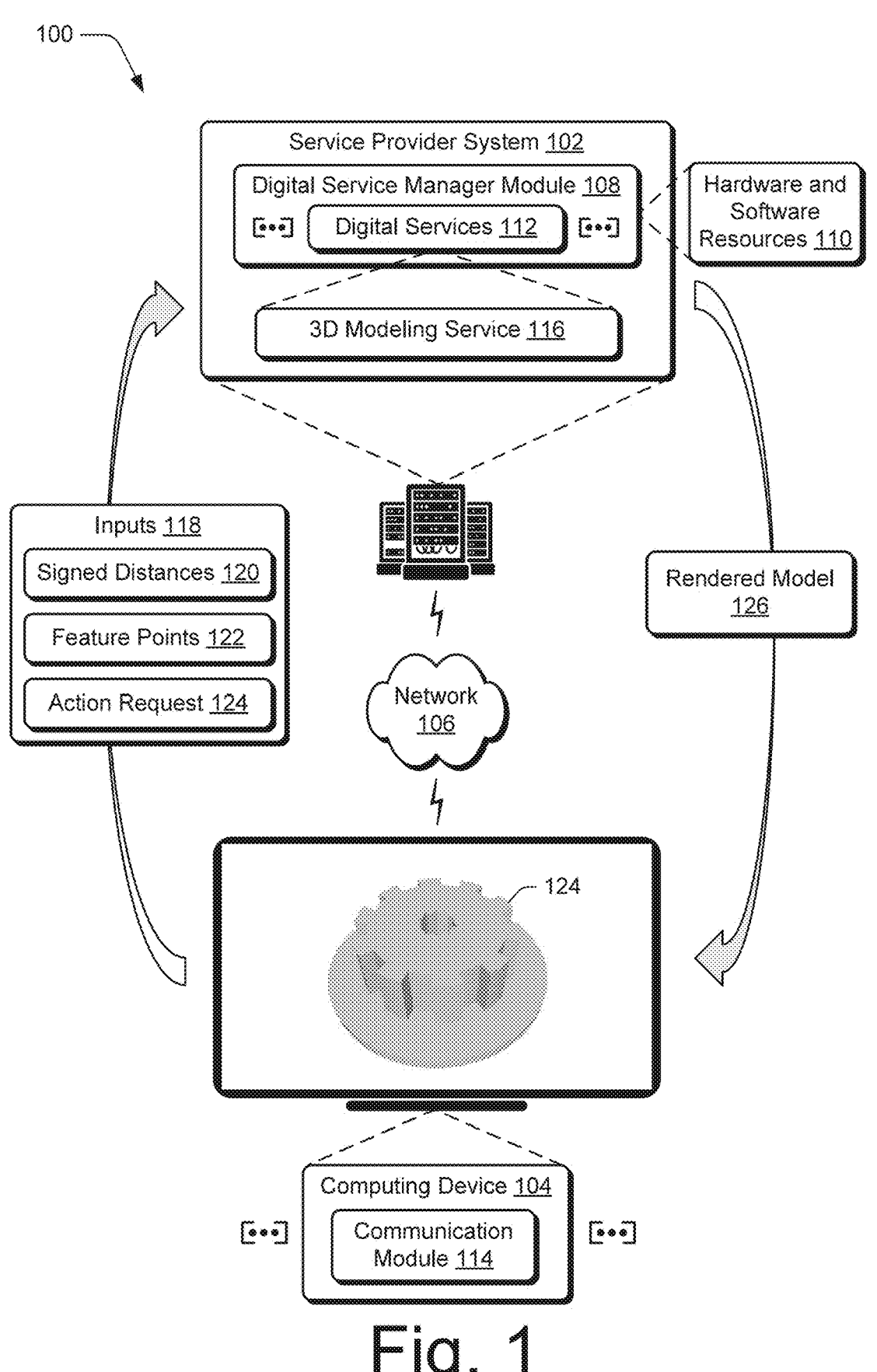
FIG. 1 illustrates a digital medium environment in an example implementation that is operable to employ volumetric sculpting techniques as described herein.

The movie industry and the visual effects community employ volumetric sculpting tools to create realistic digital objects and characters. Despite advancements in high-end modeling systems, generating 3D models with sharp features and faithful representation of geometric features remains difficult.

One conventional technique stores signed distances in voxel grids and then runs a marching cubes algorithm to extract a mesh for modeled objects. A voxel, short for volumetric pixel, is the 3D equivalent of a pixel in a 2D image. Voxels are generally tiny cubes within a 3D grid that combine to create a 3D representation of a modeled object. Each voxel holds a value that represents one or more object properties (e.g., color, density, material type) and signed distances.

Signed distances represent the geometry of modeled objects using a mathematical function. Instead of defining a 3D object with a set of polygons (e.g., triangles and squares), signed distances use a function that takes a point in 3D space as input and returns a value indicating the distance to the closest surface of the object. The sign of the value indicates whether the point is inside (e.g., a negative value) or outside (e.g., a positive value) the object. On the surface of the object, the value is equal to zero. Storing signed distances in voxel grids may not accurately represent geometric shape features and the generation of artifacts when performing downstream operations such as up-resolution, down-resolution, warping, and solid geometry operations (e.g., Boolean operations).

The marching cubes algorithm extracts a polygonal mesh or surface from the 3D volumetric dataset contained in the voxel grids. In other words, the marching cubes algorithm takes signed distance values in the voxel grids and converts them into a collection of polygons that define the object's surface. Specifically, the marching cubes algorithm constructs triangles within each voxel grid cell that are stitched together to form the final mesh. The triangle for each voxel grid cell is selected from a set of possible triangle configurations depending on the signed distance values within the voxel grid cell and its neighboring grid cells. The marching cubes algorithm struggles to represent sharp features, like a sharp edge, without very high-resolution voxel grids that are memory inefficient. For example, a cube with sharp edges is generally extracted with over-smoothed edges.

In contrast, the systems and techniques described herein introduce volumetric sculpting using dual contouring that faithfully preserves the shape and features of modeled objects. The described systems and techniques provide a new data representation and accompanying algorithms to address the issues associated with signed data values and the marching cubes algorithm. In addition to storing the signed distance of each grid vertex, the described system stores the position and state of an additional feature point in each voxel grid cell to explicitly represent sharp and smooth geometric features. Instead of running the marching cubes algorithm to obtain a mesh, the system runs dual contouring or dual marching cubes to obtain a mesh or manifold mesh. In this way, the described techniques provide a convenient way for volumetric sculpting tools to model sharp features and faithfully preserve geometric features during modeling and after performing geometric operations.

In an example implementation, a processing device determines and stores signed distance values of vertices in a voxel grid with multiple grid cells to represent a 3D object. The processing device also determines and stores the position and state of feature points within grid cells. The feature point indicates a geometric feature of the 3D object within a corresponding grid cell. The processing device then uses dual contouring on the signed distance values and feature points to render a mesh of the 3D object.

The following discussion describes an example environment that employs the techniques described herein. Example procedures are also described as performable in the example and other environments. Consequently, the performance of the example procedures is not limited to the example environment, and the example environment is not limited to the performance of the example procedures.

Example Volumetric Sculpting Environment

FIG. 1 illustrates a digital medium environment 100 in an example implementation that is operable to employ volumetric sculpting techniques as described herein. The illustrated digital medium environment 100 includes a service provider system 102 and a computing device 104 that are communicatively coupled, one to another, via a network 106. Computing systems for the service provider system 102 and the computing device 104 are configurable in various ways. For instance, computing device 104 is associated with a user, and service provider system 102 is a remote computing system (e.g., one or more servers) configured to employ the described techniques and systems for volumetric sculpting using dual contouring.

A computing system, for instance, is configurable as a desktop computer, laptop computer, mobile device (e.g., assuming a handheld configuration such as a tablet or mobile phone), server, and so forth. Thus, the service provider system 102 or the computing device 104 can range from a full-resource device with substantial memory and processor resources (e.g., servers and personal computers) to a low-resource device with limited memory and/or processing resources (e.g., some mobile devices). Additionally, although a single computing device is shown for the computing device 104 and described in instances in the following discussion, a computing system is also representative of a plurality of different devices, such as multiple servers utilized by a business to perform operations "over the cloud" for the service provider system 102 and as further described with FIG. 7.

The service provider system 102 includes a digital service manager module 108 implemented using hardware and software resources 110 (e.g., a processing device and computer-readable storage medium) to support one or more digital services 112. Digital services 112 are made available remotely via the network 106 to computing devices, e.g., computing device 104.

Digital services 112 are scalable through implementation by the hardware and software resources 110 and support a variety of functionalities, including accessibility, verification, real-time processing, analytics, load balancing, and so forth. Examples of digital services include a social media service, streaming service, digital content repository service, content collaboration service, and so on. Accordingly, in the illustrated example, a communication module 114 (e.g., browser, network-enabled application, and so on) is utilized by the computing device 104 to access the digital services 112 via the network 106. A result of processing using the digital services 112 is then returned to the computing device 104 via the network 106.

In the illustrated digital medium environment 100, the digital services 112 include a 3D modeling service 116 for generating and manipulating 3D objects using volumetric sculpting techniques. Although illustrated as implemented remotely by the service provider system 102, the functionality of the 3D modeling service 116 is also configurable for local implementation, e.g., as part of the computing device 104.

To generate 3D objects, the 3D modeling service 116 processes inputs 118 to generate a rendered model 126 with faithfully reproduced sharp or smooth features. The inputs 118 include signed distances 120, feature points 122, and an action request 124. The signed distances 120 provide a signed distance value for a vertex (e.g., the top-left-front vertex) of each grid cell, while the feature points 122 indicate the position and state of an additional point within each grid cell to represent geometric features explicitly. The action request 124 indicates the type of mesh, geometric operation, or processing to be modeled. In other implementations, a representation of an object is provided as an input 118, and the 3D modeling service 116 extracts or determines the signed distances 120 and feature points 122 for each grid cell.

By storing additional information in the voxel grids via feature points 122, the 3D modeling service 116 explicitly tracks sharp and smooth geometric features. As a result, these features are well preserved during modeling and after performing geometric operations. In addition, because the 3D modeling service 116 still utilizes a voxel grid, conventional and existing volumetric sculpting tools can be directly applied to the rendered model 126.

In general, functionality, features, and concepts described in the examples above and below are employed in the context of the example procedures described in this section. Further, functionality, features, and concepts described with different figures and examples in this document are interchangeable and are not limited to implementation in the context of a particular figure or procedure. Moreover, blocks associated with different representative procedures and corresponding figures herein are applicable together and/or combinable in different ways. Thus, individual functionality, features, and concepts described with different example environments, devices, components, figures, and procedures herein are usable in any suitable combinations and are not limited to the particular combinations represented by the enumerated examples in this description.

Example Volumetric Sculpting Using Dual Contouring

Figure 2:
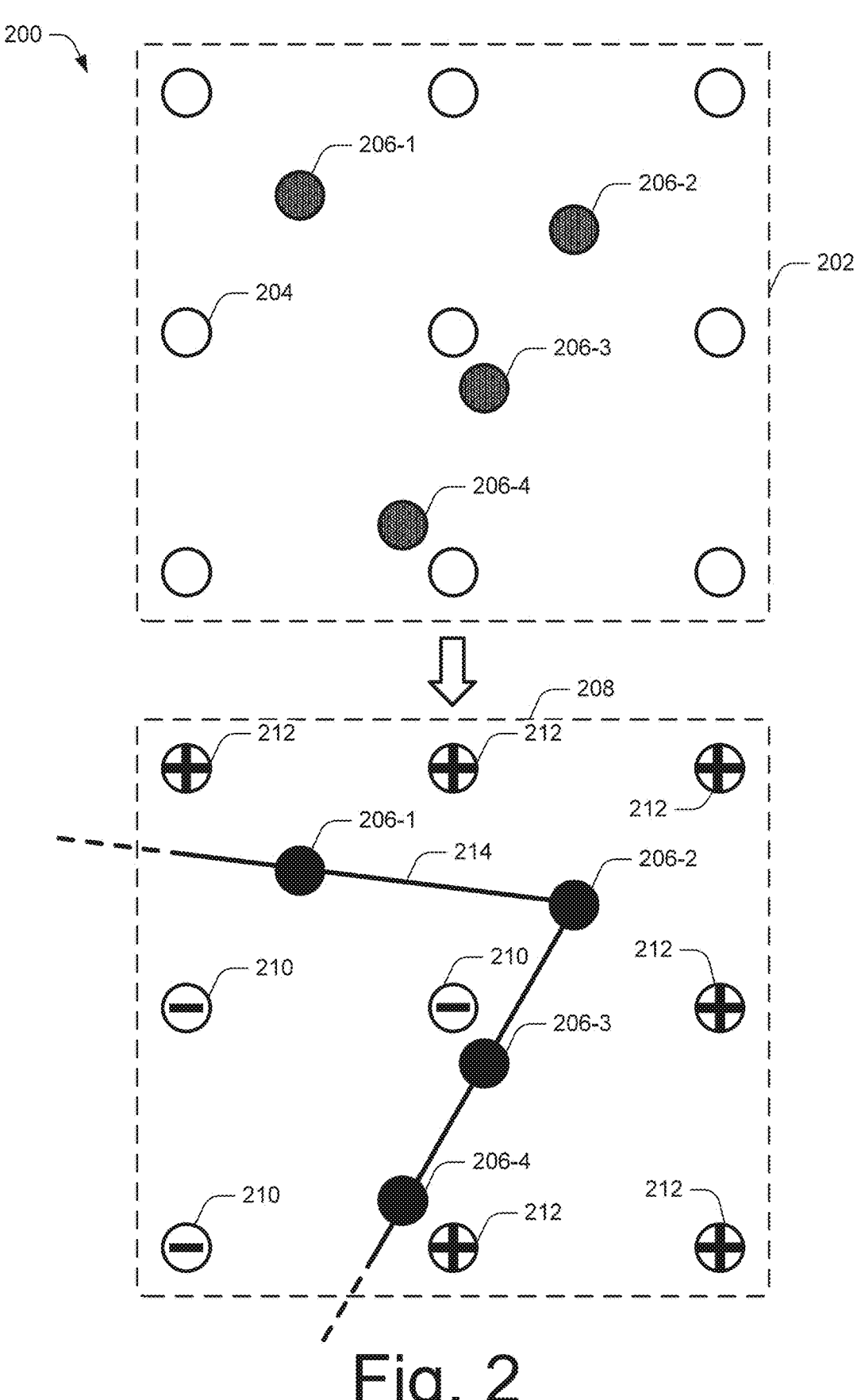
FIG. 2 illustrates an example of data storage and mesh generation for volumetric sculpting as described herein.

FIG. 2 illustrates an example 200 of data storage and mesh generation for volumetric sculpting as described herein.

The storage of signed distances and feature points is illustrated as a collection 202 of data points in FIG. 2. Although the data points are illustrated in two dimensions, the described techniques run in three dimensions. The collection 202 includes a series of signed distances 204 that form a 3D voxel grid. As described above, the signed distances 204 indicate the distance to the closest surface of the modeled object, with the sign of the value indicating whether the point is inside (negative value) or outside (positive value) of the object. The collection 202 also includes a series of feature points 206 representing geometric features within each grid cell. In other words, each grid cell includes a single feature point 206.

For each grid cell in the vertex grid, the 3D modeling service 116 stores (1) the signed distance 204 of a particular vertex corner (e.g., top-left-front vertex) of the grid cell; (2) the position (e.g., Cartesian coordinates) of the feature point 206; and (3) the state of the feature point 206. Possible states for feature point 206 include a face, edge, or corner of the modeled object. In the illustrated collection 202, feature points 206-1, 206-3, and 206-4 are shape faces, while feature point 206-2 is a shape corner. The definition and computation of the feature point 206 is described in greater detail with respect to FIG. 3. In other implementations, the feature point 206 is only stored for grid cells that include a face, edge, or corner of the modeled object to save computing resources.

In one implementation, the signed distance 204 of the top-left-front vertex is stored for each grid cell. Other predetermined vertices can be stored in other implementations of the 3D modeling service 116. Although the position of the feature point 206 is generally provided in a Cartesian coordinate system's x, y, and z coordinates. Cylindrical, spherical, or other coordinate systems are used in other implementations to provide spatial coordinates of the feature point.

The collection 202 of signed distances 204 and feature points 206 are rendered into a mesh 208 of the modeled object using dual contouring (as described in greater detail with respect to FIG. 3). For illustrative purposes, the mesh 208 of FIG. 2 shows a cross-section of the object with a surface 214. As discussed above and illustrated, feature points 206-1, 206-3, and 206-4 define a face of the surface 214, while feature point 206-2 defines a corner of the surface 214. Negative signed distances 210 indicate the shortest distances up to surface 214 for the corresponding grid cells, while positive signed distances 212 indicate the shortest distances down to surface 214. In other words, the negative signed distances 210 are inside the surface 214 (as represented by the minus sign), and the positive signed distances 212 are outside (as represented by the plus sign).

Example Volume Sculpting Procedure

The following discussion describes volume sculpting techniques that are implementable utilizing the described systems and devices. Aspects of each procedure are implemented in hardware, firmware, software, or a combination thereof. The procedure is illustrated as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions, thereby creating a special-purpose machine for carrying out an algorithm as illustrated by the flow diagram. As a result, the instructions are stored on a computer-readable storage medium that causes the hardware to perform the algorithm, e.g., responsive to the execution of the instructions. In portions of the following discussion, reference will be made to FIGS. 1 and 2.

FIG. 3 is a flow diagram depicting an algorithm as a step-by-step procedure 300 in an example implementation of operations performable for accomplishing volumetric sculpting using dual contouring. In this example, a processing device determines, receives, and/or stores the signed distance 204 of each vertex in a voxel grid (block 302). In particular, the 3D modeling service 116 determines, receives, or stores the signed distance 204 of a particular grid vertex (e.g., top-left-front vertex) for each grid cell in the vertex grid.

The processing device also determines, receives, and/or stores the position and state of a feature point 206 within each grid cell (block 304). To do so, the processing device determines the number of continuous surfaces inside the grid cell (block 306) and the optimal feature point position on the 3D object's surface, edge, or corner for each grid cell (e.g., the closest point on the shape or object to the center of the grid cell) (block 308) to determine the state and position of each feature point, respectively. The signed distances 204 and the position and state of each feature point 206 are computed during the instantiation of a primitive shape (e.g., a cube, cylinder, sphere, etc.).

In other words, the state of each feature point 206 is defined as the number of continuous surfaces inside the corresponding grid cell. If a single continuous surface is inside the grid cell, the state is set to one (1), representing a face. If two continuous surfaces are inside the grid cell, the state is set to two (2) representing an edge. If three or more continuous surfaces are within the grid cell, the state is set to three (3) representing a corner.

Figure 4:
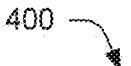
FIG. 4 illustrates an example distribution of states for feature points for an object rendered using the described volumetric sculpting techniques.

FIG. 4 illustrates an example distribution 400 of states for feature points 206 for an object rendered using the described volumetric sculpting techniques. The red-shaded areas 402 represent faces where the value of the corresponding feature point 206 equals one. The green-shaded areas 404 represent edges where the corresponding feature point value equals two. The blue-shaded areas 406 represent the object's edges where the corresponding feature point value equals three. In this way, the described techniques and systems faithfully represent and maintain the sharp features of objects, even at the intersection of different primitive shapes.

The position of each feature point 206 is determined as the closest point on the shape's surface, edge, or corner (depending on the state of the feature point 206) with respect to the center of the grid cell. For example, if the state of a feature point 206 is equal to two (for an edge), the processing device determines the point along the edge nearest the center of the corresponding grid cell.

The processing device extracts a mesh of the object or shape's surface from the signed distances 204 and feature points 206 (block 310). The 3D modeling service 116 uses dual contouring to extract or render the mesh. Dual contouring is a 3D modeling technique to extract isosurfaces (surfaces with a constant value) from volumetric data (e.g., the signed distances 204 and feature points 206). The algorithm analyzes the signed distances 204 within each grid cell and identifies edges (between vertices) where the value changes sign (goes from positive to negative or vice versa). These sign changes indicate that the isosurface passes through that edge. Dual contouring places a single quadrilateral face on each edge where a sign change is detected, connecting the four feature points from the four adjacent cells of that edge to form a polygon mesh representing the isosurface. The quadrilateral faces can be split into triangles to form a triangle mesh in some implementations to create the final 3D model.

Utilizing the information provided by the feature points 206, dual contouring as employed by the described 3D modeling service 116 is adept at capturing sharp edges and corners in the isosurface, which can be challenging for conventional techniques without feature points 206 or using the marching cubes algorithm. The described techniques also avoid the stair-stepping artifacts often produced by marching cubes, especially for shapes with sharp edges.

If a manifold mesh is to be extracted, the 3D modeling service 116 uses dual marching cubes to render the manifold mesh. A manifold mesh is a type of mesh that represents a closed and watertight surface. In a manifold mesh, each edge connects exactly two faces, creating a clean and well-defined surface. On the other hand, non-manifold meshes can have various inconsistencies (e.g., an edge might connect to only one face, holes in the mesh, or self-intersections in the mesh).

Dual marching cubes (DMC) is a 3D modeling technique that builds on marching cubes and dual contouring concepts. Like dual contouring, DMC operates on a grid-based volumetric data set (e.g., the signed distances 204 and features points 206). DMC utilizes a loop-up table for different grid cell configurations, which considers mesh connectivity so that when connecting the feature points to form meshes, the mesh is guaranteed to be a manifold mesh.

The processing device updates the signed distances 204 and the position and state of each feature point 206 after each geometric operation (block 312). In this way, the described techniques preserve sharp features during multiple operations and avoid the artifacts inherent to many conventional techniques.

FIG. 5 illustrates an example object 500 generated using volumetric sculpting with dual contouring after a geometric operation. Example geometric operations include union operations, subtraction operations, down-sampling, up-sampling, up-resolution, down-resolution, affine transformations, or buildup operations. Specifically, the object 500 is created by subtracting a box from a spheric shape. View 502 illustrates object 500 with flat shading, while view 504 illustrates it in a wire frame. As illustrated in FIG. 5, the described techniques preserve the sharp features of the box after the subtraction operation.

Figure 6:
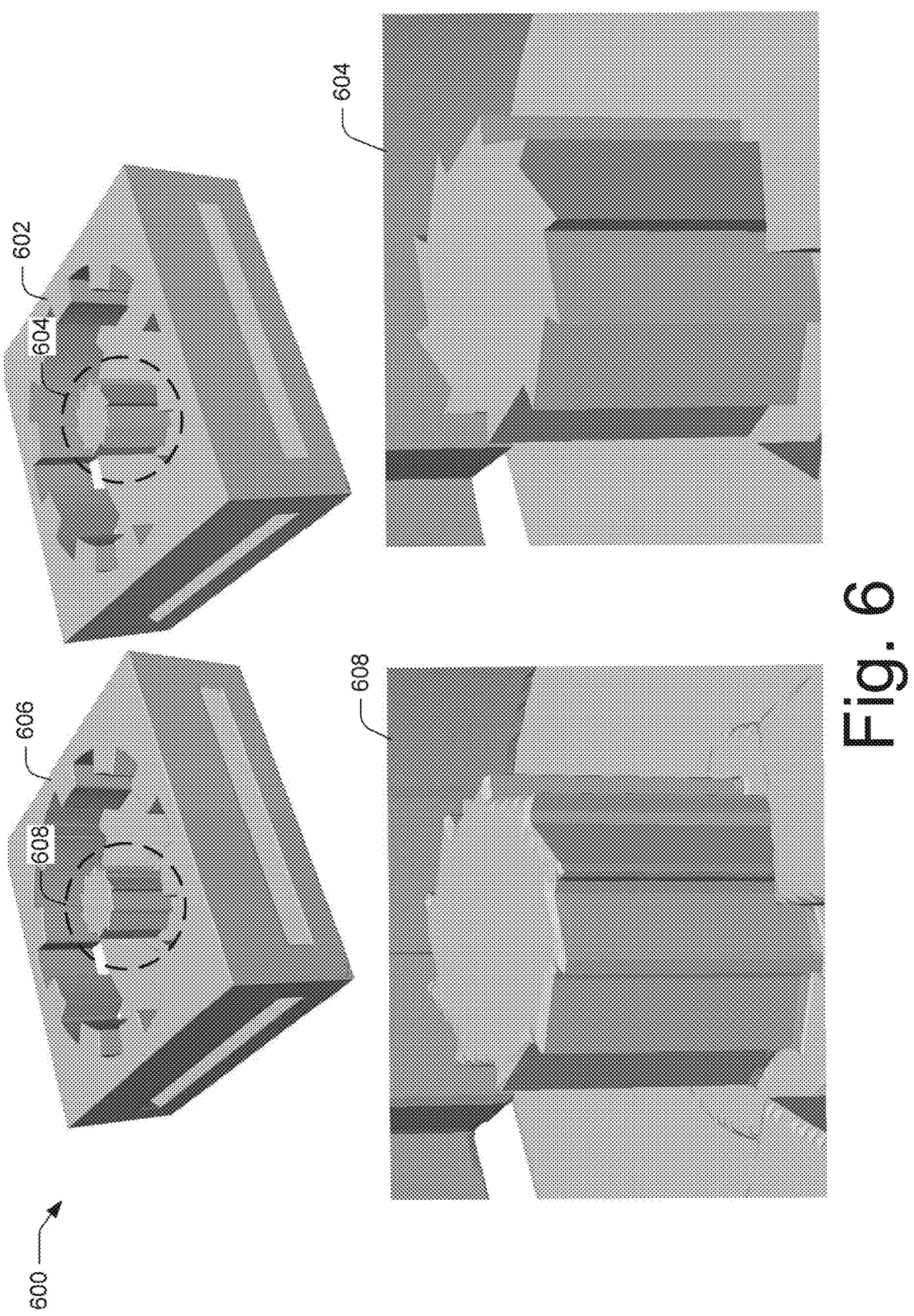
FIG. 6 illustrates an example of objects generated using volumetric sculpting with dual contouring versus the same object generated using conventional techniques.

FIG. 6 illustrates an example 600 of objects generated using volumetric sculpting with dual contouring versus the same object generated using conventional techniques. The objects are generated by performing a subtraction operation of a gear and disc from a cuboid. Object 602 is generated using the described techniques with a close-up view 604 of the sprocket. Object 606 is generated using signed distance values and marching cubes, with a close-up view 608 of the sprocket. As illustrated by the close-up view 604, 608, the described techniques preserve the sharp features of the center sprocket while the conventional techniques smooth out the edges and introduce some artifacts.

Example System and Device

Figure 7:
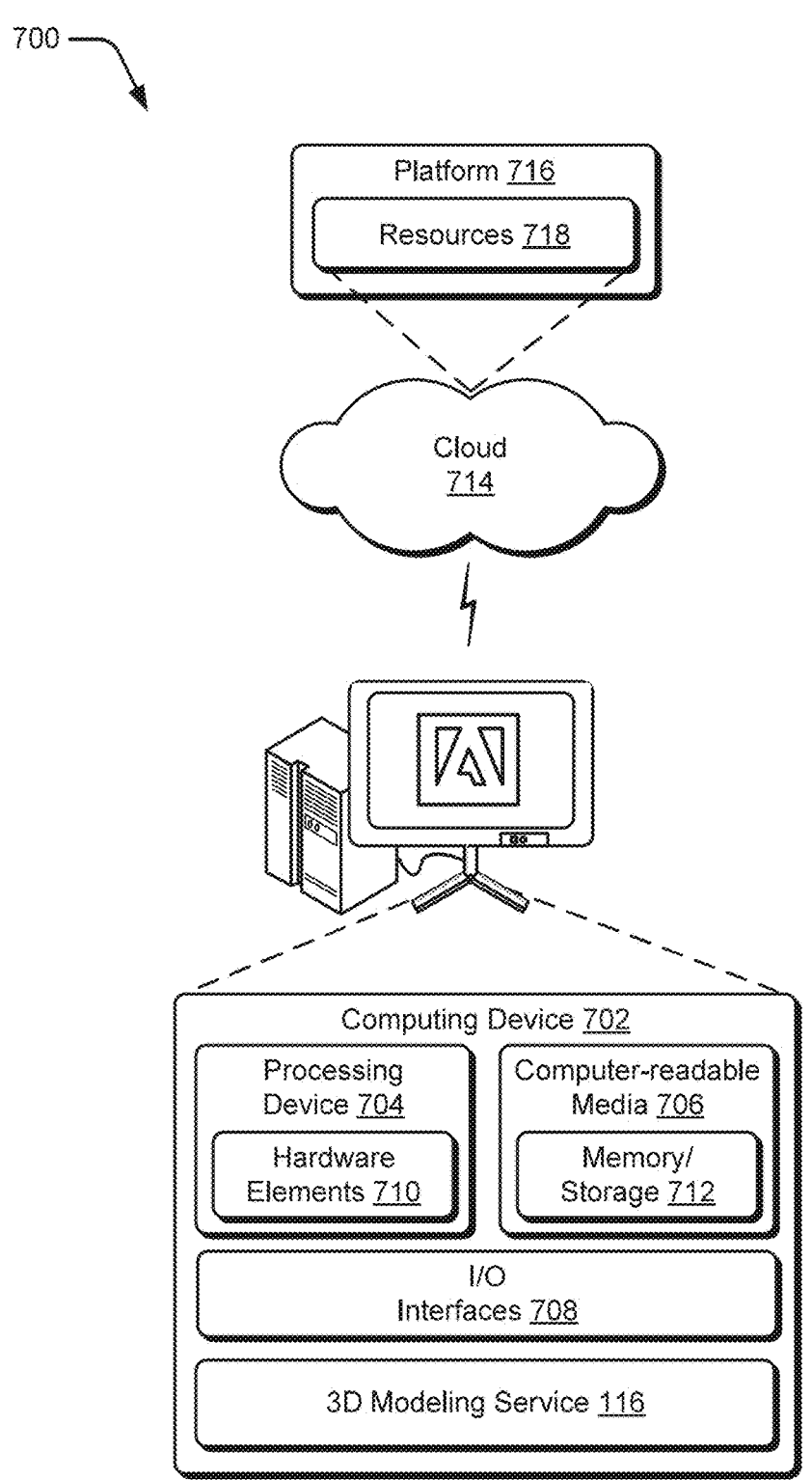
FIG. 7 illustrates an example system including various components of an example device that can be implemented as any type of computing device as described and/or utilized with reference to the previous figures to implement embodiments of the techniques described herein.

FIG. 7 illustrates an example system 700 that includes an example computing device 702 that represents one or more computing systems and/or devices usable to implement the techniques described herein. This is illustrated through the inclusion of the 3D modeling service 116. The computing device 702 is configurable, for example, as a service provider server, a device associated with a client (e.g., a client device), an on-chip system, and/or any other suitable computing device or computing system.

The example computing device 702, as illustrated, includes a processing system 704, one or more computer-readable media 706, and one or more I/O interfaces 708 that are communicatively coupled, one to another. Although not shown, the computing device 702 further includes a system bus or other data and command transfer system that couples the various components from one to another. For example, a system bus includes any combination of different bus structures, such as a memory bus or controller, a peripheral bus, a universal serial bus, and/or a processor or local bus that utilizes various bus architectures. Various other examples are also contemplated, such as control and data lines.

The processing system 704 represents the functionality to perform one or more operations using hardware. Accordingly, the processing system 704 is illustrated as including hardware elements 710 that are configured as processors, functional blocks, and so forth. This includes example implementations in hardware as an application specific integrated circuit or other logic device formed using one or more semiconductors. The hardware elements 710 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 706 is illustrated as including memory/storage 712. Memory/storage 712 represents memory or storage capacity associated with one or more computer-readable media. In one example, the memory/storage 712 includes volatile media (such as random access memory (RAM)) and/or nonvolatile media (such as read-only memory (ROM), Flash memory, optical disks, magnetic disks, and so forth). In another example, the memory/storage 712 includes fixed media (e.g., RAM, ROM, a fixed hard drive, and so on) and removable media (e.g., Flash memory, a removable hard drive, an optical disc, and so forth). The computer-readable media 706 is configurable in various ways, as described below.

Input/output interface(s) 708 represent functionality that allows a user to enter commands and information to computing device 702 and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in various ways to support user interaction, as further described below.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on various commercial computing platforms with various processors.

Implementations of the described modules and techniques are stored on or transmitted across some form of computer-readable media. For example, the computer-readable media includes a variety of media accessible to the computing device 702. By way of example, and not limitation, computer-readable media includes "computer-readable storage media" and "computer-readable signal media."

"Computer-readable storage media" refers to media and/or devices that enable persistent and/or non-transitory information storage in contrast to mere signal transmission, carrier waves, or signals per se. Thus, computer-readable storage media refers to non-signal-bearing media. The computer-readable storage media includes hardware such as volatile and non-volatile, removable and non-removable media, and/or storage devices implemented in a method or technology suitable for storage of information such as computer-readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium configured to transmit instructions to the hardware of the computing device 702, such as via a network. Signal media typically embodies computer-readable instructions, data structures, program modules, or other data in a modulated data signal, such as carrier waves, data signals, or other transport mechanisms. Signal media also includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic, and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware and hardware utilized to store instructions for execution, e.g., the computer-readable storage media described previously.

Combinations of the foregoing are also employable to implement various techniques described herein. Accordingly, software, hardware, or executable modules are implementable as instructions and/or logic embodied on some form of computer-readable storage media and/or by one or more hardware elements 710. For example, the computing device 702 is configured to implement particular instructions and/or functions corresponding to the software and/or hardware modules. Accordingly, implementation of a module executable by the computing device 702 as software is achieved at least partially in hardware, e.g., through computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supportable by various configurations of the computing device 702 and are not limited to the specific examples of the techniques described herein. This functionality is also implementable entirely or partially through a distributed system, such as over a "cloud" 714, as described below.

Cloud 714 includes and/or represents a platform 716 for resources 718. The platform 716 abstracts the underlying functionality of hardware (e.g., servers) and software resources of the cloud 714. For example, resources 718 include applications and/or data utilized while computer processing is executed on servers remote from the computing device 702. In some examples, the resources 718 also include services provided over the Internet and/or through a subscriber network, such as a cellular or Wi-Fi network.

Platform 716 abstracts the resources 718 and functions to connect the computing device 702 with other computing devices. In some examples, the platform 716 also serves to abstract scaling of resources to provide a corresponding level of scale to encountered demand for the resources implemented via the platform. Accordingly, in an interconnected device embodiment, the implementation of functionality described herein is distributable throughout system 700. For example, the functionality is implementable in part on the computing device 702 and via the platform 716, which abstracts the functionality of the cloud 714.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

What is claimed is:

1. A method comprising:
   determining, by a processing device, signed distance values of vertices in a voxel grid to represent a three-dimensional (3D) object;
   determining, by the processing device, feature points within grid cells of the voxel grid that represent a geometric feature of the 3D object within a corresponding grid cell, a state value of each feature point indicating whether the feature point is on a face, an edge, or a corner of the 3D object; and
   rendering, by the processing device and using the signed distance values and a position and the state value of the feature points, a mesh of the 3D object.

2. The method of claim 1, wherein a signed distance value of a first vertex is stored for each grid cell.

3. The method of claim 1, wherein the position of each feature point provides spatial coordinates of the feature point.

4. The method of claim 3, wherein the position and the state value of each feature point are determined during generation of each primitive shape making up the 3D object.

5. The method of claim 3, wherein the state value of each feature point is defined as a number of continuous surfaces within the corresponding grid cell.

6. The method of claim 1, wherein the state value has a value of one for the face, two for the edge, or three for the corner.

7. The method of claim 3, wherein the position of each feature point is determined as a closest point on the face, the edge, or the corner to a center of the corresponding grid cell.

8. The method of claim 1, wherein the signed distance values and the feature points are updated after a geometric operation.

9. The method of claim 8, wherein the geometric operation includes a union operation, a subtraction operation, down-sampling, up-sampling, an affine transformation, or a buildup operation.

10. The method of claim 8, wherein the geometric operation is performed on the mesh rendered from the signed distance values and the feature points.

11. The method of claim 1, wherein dual contouring is used to render the mesh or dual marching cubes is used to render a manifold mesh of the mesh.

12. A computing device comprising:

a processing device; and a computer-readable medium storing instructions that, in response to execution by the processing device, cause the processing device to:

store signed distance values of vertices in a voxel grid to represent a three-dimensional (3D) object;

store feature points within grid cells of the voxel grid that represent a face, an edge, or a corner of the 3D object within a corresponding grid cell, a state value of each feature point indicating whether the feature point is on the face, the edge, or the corner of the 3D object; and render, using the signed distance values and the feature points, a mesh of the 3D object using dual contouring.

13. The computing device of claim 12, wherein a position of each feature point provides spatial coordinates of a corresponding feature point and the state value of each feature point is defined as a number of continuous surfaces within the corresponding grid cell.

14. The computing device of claim 13, wherein the position and the state value of each feature point are determined during generation of each primitive shape making up the 3D object.

15. The computing device of claim 12, wherein the dual contouring places a quadrilateral face on each edge of the voxel grid where a sign change in the signed distance values is detected and connects the feature points from adjacent cells of the edge to form a polygon mesh.

16. The computing device of claim 13, wherein the position of each feature point is determined as a closest point on the face, the edge, or the corner to a center of the corresponding grid cell.

17. The computing device of claim 12, wherein the computer-readable medium stores additional instructions that, in response to execution by the processing device, cause the processing device to:

generate a combined 3D object by performing one or more geometric operations on multiple 3D objects; and render the mesh of the combined 3D object that preserves geometric features of the multiple 3D objects.

18. The computing device of claim 17, wherein the signed distance values and the feature points of the combined 3D object are updated after the one or more geometric operations.

19. The computing device of claim 12, wherein the computer-readable medium stores further instructions that, in response to execution by the processing device, cause the processing device to render a manifold mesh of the 3D object using dual marching cubes.

20. A non-transitory computer-readable medium storing executable instructions, which when executed by a processing device, cause the processing device to perform operations comprising:

determining signed distance values of vertices in a voxel grid to represent a three-dimensional (3D) object;

determining feature points within grid cells of the voxel grid that represent a geometric feature of the 3D object within a corresponding grid cell, a state value of each feature point indicating whether the feature point is on a face, an edge, or a corner of the 3D object; and rendering, using the signed distance values, a mesh of the 3D object using dual contouring on the signed distance values and a position and the state value of the feature points.

* * * * *